United States Patent [19]

Kawabata

[11] Patent Number: 4,822,555
[45] Date of Patent: Apr. 18, 1989

[54] CONTAINER FOR PLATE-LIKE OBJECTS

[75] Inventor: Hiroaki Kawabata, Tsuruga, Japan

[73] Assignee: Nuclear Services Company, Tokyo, Japan

[21] Appl. No.: 63,657

[22] Filed: Jun. 18, 1987

[51] Int. Cl.$^4$ ............................................. G21C 19/32
[52] U.S. Cl. .................................... 376/272; 206/449; 211/51
[58] Field of Search ................... 376/272; 220/20, 22; 206/449, 366, 365, 363, 370, 438; 100/194, 220; 250/506.1, 507.1; 211/51, 59.3, 126

[56] References Cited

U.S. PATENT DOCUMENTS

| | | | |
|---|---|---|---|
| 1,038,474 | 9/1912 | Back | 211/51 |
| 2,973,868 | 3/1961 | Poskin | 206/449 |
| 3,055,508 | 9/2962 | Reeser | 211/51 |
| 3,764,019 | 10/1973 | Creamer | 211/51 |
| 3,892,309 | 7/1975 | Coffey et al. | 206/449 |
| 4,479,584 | 10/1984 | Raz | 211/51 |
| 4,507,840 | 4/1985 | Steinert et al. | 376/272 |
| 4,588,093 | 5/1986 | Field | 211/51 |
| 4,643,845 | 2/1987 | Omote et al. | 376/272 |
| 4,683,110 | 7/1987 | Baudro et al. | 376/272 |

*Primary Examiner*—Charles T. Jordan
*Assistant Examiner*—Daniel Wasil
*Attorney, Agent, or Firm*—Wenderoth, Lind & Ponack

[57] ABSTRACT

A container for L-shaped plate-like objects, comprising an elongated spring provided in the container so as to extend thereacross, one end of the elongated spring being fixed to one inner surface of the container with the other end being free and able to urge the L-shaped plate-like object to an inner surface of the container which is opposite to the inner surface to which the plate spring is fixed.

3 Claims, 3 Drawing Sheets

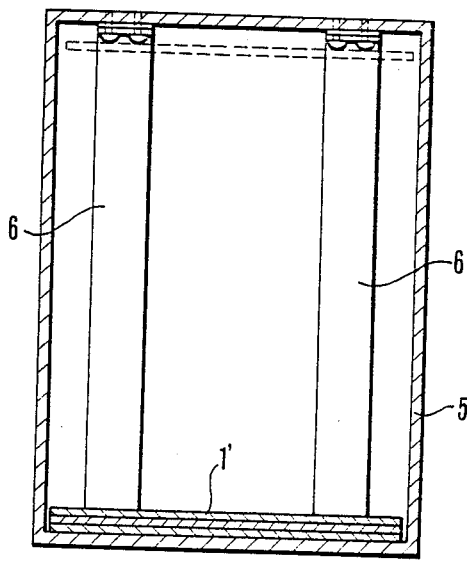
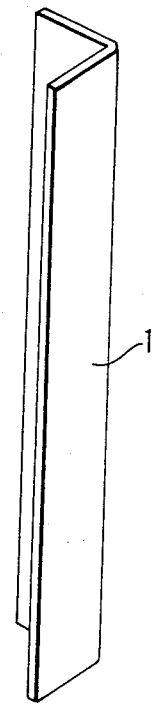
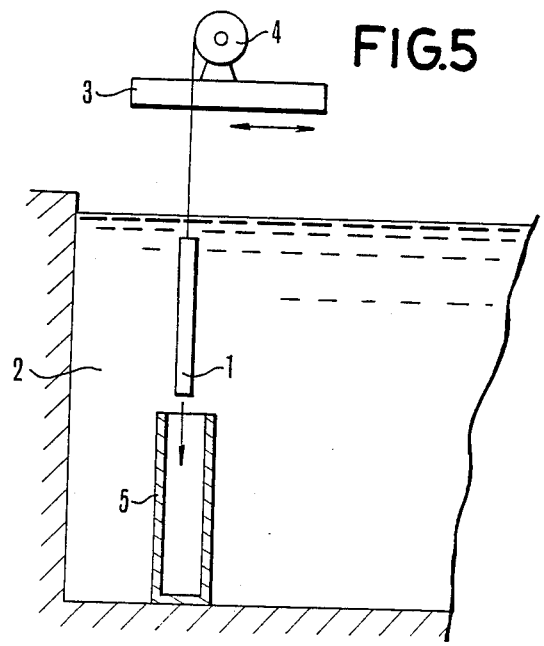

CONTAINER FOR PLATE-LIKE OBJECTS

BACKGROUND OF THE INVENTION

1. Field of the Invention

This invention relates to a container capable of holding plate-like objects including angle-like objects easily in a compactly laminated state, and more particularly to a container for plate-like objects, which is suitably used to hold, for example, plate-like wastes resulting from cutting of a used fuel channel box taken out of a boiling-water nuclear reactor.

2. Description of the Related Art

In order to place the largest possible number of plate-like objects in a container, it is necessary that the plate-like objects be laminated therein as closely as possible but laminating plate-like objects in such a manner in a container cannot always be done with ease. The conventional operation for placing plate-like objects in a container will now be described taking as an example an operation for placing in a container plate-like wastes of cut pieces of a used fuel channel box taken out of a boiling water reactor.

A fuel channel box for a boiling-water reactor is a cross-sectionally square cylinder enclosing a fuel assembly (bundle of fuel rods), having a height of about 410 cm, a width of about 15 cm and a wall thickness of 2 mm and consisting of zircaloy. When a used fuel assembly is reprocessed, the fuel channel box is removed therefrom and cut along a diagonal line of a cross section thereof in the water in a waste storage pool so as to obtain angle-like or L-shaped objects 1 of about 410 cm in length shown in FIG. 4 (accordingly, one fuel channel box is divided into two angle-like objects 1).

As shown in FIG. 5, this plate-like object 1 is suspended in the water in a waste storage pool 2 from a hoist 4, which is set on a service platform 3 provided above the pool 2 so that the platform 3 can be horizontally moved. The suspended plate-like object 1 is transferred to the position in the water and above a container 5 in the pool 2 and placed therein. Needless to say, the purpose of handling the plate-like object 1 in a waste storage pool is to prevent the radiation exposure.

In order to utilize a waste storage space with a higher efficiency, it is necessary that the largest possible number of plate-like objects 1 be placed in each container 5. Accordingly, in the conventional techniques of this kind, a worker on the service platform 3 holds an elongated rod and pushes at its free end the plate-like object 1 being placed in the container 5, in such a manner that the plate-like objects therein contact each other as closely as possible. However, moving an elongated rod in the water causes the operation efficiency to lower, and it is difficult to place plate-like objects in the container compactly by this method. Therefore, by this method, only thirty pieces of plate-like objects 1 can be placed in a container of 300 mm in length and 227 mm in width.

SUMMARY OF THE INVENTION

An object of the present invention is to provide a simply-constructed container for plate-like objects, which is capable of holding plate-like objects in a tightly laminated state, whereby the utilization of the hollow in the container and the efficiency of placing plate-like objects in the container can be improved.

The features of the container for plate-like objects according to the present invention reside in that elongated springs are provided in the container so as to extend thereacross in such a manner that one end of each of the springs is fixed to one inner wall surface of the container with the other end thereof being free and able to urge the introduced plate-like objects to the opposite inner wall surface of the container. Owing to these springs, plate-like objects can be placed in the container in a laminated state so that the plate-like objects tightly contact each other and the inner surface of the container closely.

The above and other objects as well as advantageous features of the invention will become apparent from the following description of the preferred embodiments taken in conjunction with the accompanying drawings.

BRIEF DESCRIPTION OF THE DRAWINGS

FIG. 3 is a horizontal section of another embodiment of the present invention;

FIG. 4 is a perspective view of a plate-like object produced by cutting a fuel channel box taken out of a boiling water reactor; and FIG. 5 is a schematic diagram showing such a plate-like objects being placed in a container for cut fuel channel boxes.

DETAILED DESCRIPTION OF THE PREFERRED EMBODIMENTS

Figure 1:
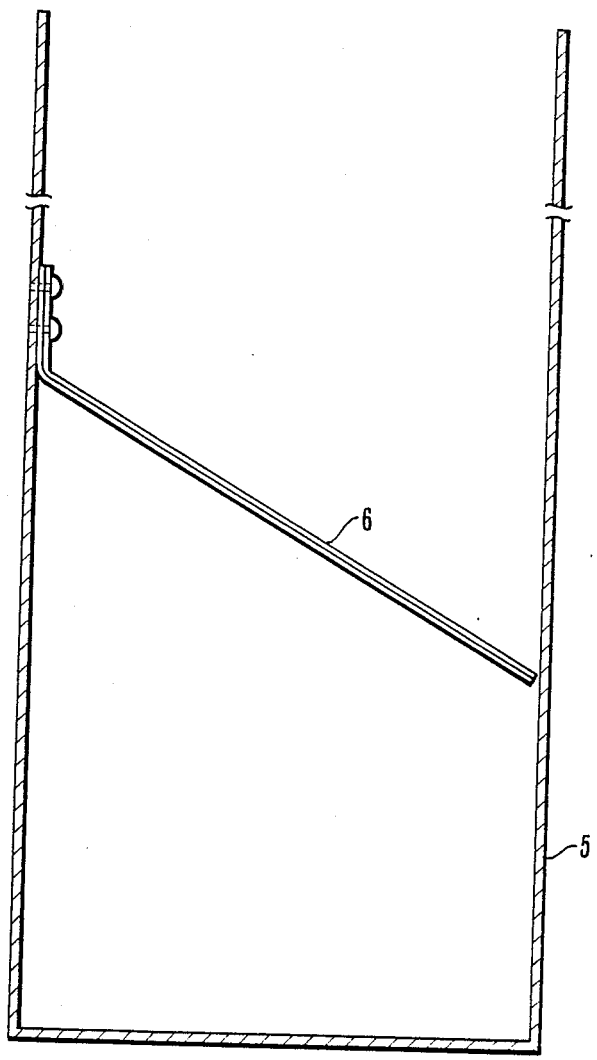
FIGS. 1 and 2 are a sectioned side elevation and a horizontal section, respectively, of an embodiment of the present invention.
Figure 2:
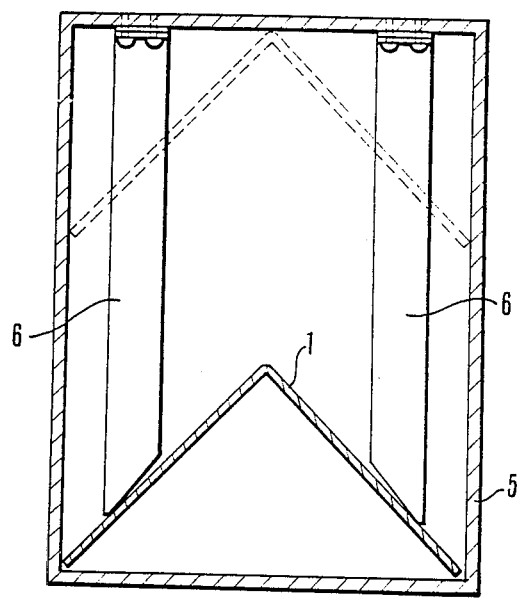

An embodiment of the present invention will now be described with reference to FIGS. 1 and 2. This is an embodiment of a container for use in placing plate-like objects 1 therein which are produced by cutting used fuel channel boxes as mentioned above. FIG. 1 is a longitudinal section of the embodiment, and FIG. 2 is a horizontal section thereof.

Referring to these drawings, reference numeral 5 denotes a container body which consists in this embodiment of a cross-sectionally rectangular box having a height of 412 cm, a width of 227 mm, a length of 300 mm and a wall thickness of 6 mm and made of SUS304 stainless steel. Reference numeral 6 denotes two plate springs each of which consists of a double plate material and extends diagonally in the lengthwise direction of the container 5. The upper end portion of each plate spring is fixed to the wall of the container 5 by welding or by suitable means, such as screws or rivets, and the lower end portion thereof is positioned near an inner surface of the container 5 or contacts the same lightly or urges the same with a suitable level of resilient force. The lower end of each plate spring 6 is preferably in the position which is not higher than the middle of a total height of the container 5.

In this embodiment, each plate spring 6 is made of SUS304 stainless steel, and its fixing point is on the portion of the inner wall surface of the container 5 which is vertically about 170 cm away from the lower end thereof, the lower end of the plate spring 6 urging with a force of about 1 kg the portion of the opposite inner wall surface of the container 5 which is vertically about 100 cm away from the lower end thereof. These numerical values are shown as examples, and may be set to suitable different levels as necessary.

A container 5 of the above-described construction is set in a storage pool 2 in the same manner as shown in FIG. 5, and a plate-like object 1 produced by cutting a used fuel channel box is brought above the container 5 in the same manner as mentioned above. When the plate-like object 1 is lowered from a position in the upper portion of FIG. 1 into the interior of the container 5, it is pressed by the plate spring 6 as it is guided into the container. The plate-like object 1 is thus placed in the container 5 with the former contacting the inner wall surface of the latter. When a subsequent plate object 1 is then lowered in a suspended state into the container 5 in the same manner, it is placed therein in close contact with the preceding plate-like object through the same actions as described above. The plate-like objects 1 are thus placed successively in tight contact with one another until the last plate-like object 1 is placed in the position shown by a broken line in FIG. 2.

In a conventional container of this kind having no plate spring 6 therein, only thirty pieces (corresponding to fifteen channel boxes) at most of plate-like objects 1 can be held, while, in the above embodiment of the present invention, which has the same dimensions as the conventional container, thirty-six (corresponding to eighteen channel boxes) plate-like objects 1 can be held even if the elongated rod referred to in the statement under "Description of the Related Art" is not used.

FIG. 3 is a horizontal section of an embodiment of the present invention in which flat plate-like objects, not angle-like objects, are to be placed in tight contact with one another, the construction and operation of this embodiment being similar to those of the first embodiment previously described. In this embodiment, the plate-like objects 1' can be inserted in a tightly laminated state until the last plate-like object 1' is placed in the position shown by a broken line in the same drawing.

In the above-described embodiments, two plate springs 6 are arranged in the widthwise direction of a container. One plate spring may also be provided at the widthwise intermediate portion of the interior of the container, or not less than two plate springs at horizontally symmetric portions of the interior thereof. In the above-described embodiments, only one or only one horizontal row of plate springs are provided in the container. The plate springs may also be provided at vertically spaced portions of the interior of the container. The form of the springs may be modified in various manners.

The present invention has been described on the basis of its embodiments used as containers for plate-like objects produced by cutting fuel channel boxes taken out of a nuclear reactor. The use of the present invention is not limited to this. It can, of course, be used as a container for general plate-like objects.

According to the present invention, plate-like objects can be placed in a container with a high operation efficiency with the former tightly contacting one another and the inner surface of the latter, by merely lowering the plate-like objects successively into the interior of the container. The container according to the present invention is capable of holding a larger number of plate-like objects as compared with a conventional container of this kind of the same dimensions. Therefore, the space utilization rate of the container can be improved. Moreover, the construction of the container is very simple.

The present invention is not, of course, limited to the above embodiments; it may be modified in various ways within the scope of the appended claims.

What is claimed is:

1. An apparatus for storing L-shaped objects, said apparatus comprising:
    an upwardly opening container having at least two spaced opposed walls; and
    at least one pair of spaced opposed leaf springs, each one of said at least one pair of leaf springs having first and second ends, each said first end of each said pair of leaf springs being attached to the inside surface of one of said at least two spaced opposed walls, each one of said leaf springs extending downwardly inside said container toward the other one of said at least two spaced opposed walls, each said second end of said leaf springs being free and having an oblique end, each pair of said oblique ends of each pair of said at least one pair of spaced opposed leaf springs defining an L-shape for contacting an L-shaped object for retaining an L-shaped object upright when an L-shaped object is inserted into said upwardly opening container.

2. In combination, a water pool and an upwardly opening container in said water pool for storing substantially L-shaped cut halves of spent atomic fuel channel boxes, said upwardly opening container comprising:
    at least two spaced opposed walls; and
    at least one pair of spaced opposed leaf springs, each one of said at least one pair of leaf springs having first and second ends, each said first end of each said pair of leaf springs being attached to the inside surface of one of said at least two spaced opposed walls, each one of said leaf springs extending downwardly inside said container toward the other one of said at least two spaced opposed walls, each said second end of said leaf springs being free and having an oblique end, each pair of said oblique ends of each pair of said at least one pair of spaced opposed leaf springs defining an L-shape for contacting an L-shaped object for retaining an L-shaped object upright when an L-shaped object is inserted into said upwardly opening container.

3. The combination as in claim 2, further comprising means for suspending and transferring the substantially L-shaped cut halves of spent atomic fuel boxes to a position in said upwardly opening container.

* * * * *